(12) United States Patent
Alcazaren et al.

(10) Patent No.: US 7,911,937 B1
(45) Date of Patent: Mar. 22, 2011

(54) COMMUNICATION NETWORK ARCHITECTURE WITH DIVERSE-DISTRIBUTED TRUNKING AND CONTROLLED PROTECTION SCHEMES

(75) Inventors: Edgar C. Alcazaren, Kansas City, MO (US); Bruce Hoffman, Overland Park, KS (US); Dave Polson, Olathe, KS (US); Philip D. King, Stilwell, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1943 days.

(21) Appl. No.: 10/448,565

(22) Filed: May 30, 2003

(51) Int. Cl.
*G01R 31/08* (2006.01)
(52) U.S. Cl. ......... 370/216; 370/217; 370/225; 370/228
(58) Field of Classification Search .................. 370/400, 370/389, 390, 357, 396, 402, 494, 491, 216–221, 370/225, 228; 375/500
See application file for complete search history.

(56) References Cited

U.S. PATENT DOCUMENTS

| | | | | |
|---|---|---|---|---|
| RE34,755 E | * | 10/1994 | Eng et al. .................... | 370/388 |
| 6,058,116 A | * | 5/2000 | Hiscock et al. ............. | 370/401 |
| 6,195,351 B1 | * | 2/2001 | Hiscock et al. ............. | 370/389 |
| 6,246,669 B1 | * | 6/2001 | Chevalier et al. ........... | 370/238 |
| 6,317,439 B1 | * | 11/2001 | Cardona et al. ............. | 370/503 |
| 6,359,909 B1 | * | 3/2002 | Ito et al. ...................... | 370/522 |
| 6,810,008 B2 | * | 10/2004 | Eng et al. .................... | 370/216 |
| 6,906,997 B1 | * | 6/2005 | Rajan et al. ................. | 370/216 |
| 6,907,042 B1 | * | 6/2005 | Oguchi ........................ | 370/412 |
| 7,076,594 B2 | * | 7/2006 | Benedetto et al. ........... | 710/316 |
| 7,173,936 B1 | * | 2/2007 | Semaan ................... | 370/395.51 |
| 7,187,652 B2 | * | 3/2007 | Lee et al. ..................... | 370/238 |
| 7,209,435 B1 | * | 4/2007 | Kuo et al. .................... | 370/219 |
| 7,242,664 B2 | * | 7/2007 | Einstein et al. .............. | 370/216 |
| 2002/0080790 A1 | * | 6/2002 | Beshai ......................... | 370/392 |
| 2002/0097674 A1 | * | 7/2002 | Balabhadrapatruni et al. ................................ | 370/229 |
| 2002/0150094 A1 | * | 10/2002 | Cheng et al. ................. | 370/389 |
| 2002/0167899 A1 | * | 11/2002 | Thompson et al. .......... | 370/222 |
| 2003/0048746 A1 | * | 3/2003 | Guess et al. ................. | 370/219 |
| 2003/0058791 A1 | * | 3/2003 | Soetemans et al. .......... | 370/225 |
| 2003/0147384 A1 | * | 8/2003 | Landaveri et al. ........... | 370/372 |
| 2004/0218525 A1 | * | 11/2004 | Elie-Dit-Cosaque et al. | 370/223 |
| 2004/0243661 A1 | * | 12/2004 | Ahn et al. .................... | 709/200 |

* cited by examiner

*Primary Examiner* — Kwang B Yao
*Assistant Examiner* — Nguyen Ngo

(57) ABSTRACT

A communication network architecture comprises an access tier including access packet switches coupled to users, a backbone tier including hub packet switches coupled to one another, and a transit tier including transit packet switches coupling the access tier to the backbone tier. The access packet switches are coupled to the transit tier by physically diverse access communication trunks. The transit packet switches are coupled to the backbone tier by physically diverse transit communication trunks. OSI layer one protection is disabled between the access tier and the transit tier and is disabled between the transit tier and the backbone tier. OSI layer two protection is enabled between the access tier and the transit tier and is enabled between the transit tier and the backbone tier. In some examples, a control system selects protection schemes for selected communication trunks and directs the network elements to implement the selected protection schemes on the selected communication trunks.

3 Claims, 3 Drawing Sheets

COMMUNICATION NETWORK ARCHITECTURE WITH DIVERSE-DISTRIBUTED TRUNKING AND CONTROLLED PROTECTION SCHEMES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures that have diverse-distributed trunking and controlled protection schemes.

2. Description of the Prior Art

Communication networks are becoming increasingly complex and costly. Part of the complexity and cost is due to the various protection schemes that are implemented. A protection scheme specifies how the network ensures that user communications reach their destination. This protection can be implemented at different layers of the well-known Open Systems Interconnection (OSI) Reference Model.

OSI layer one is the physical layer, and layer one protection entails using a back-up physical path when the primary physical path fails. For example, if the layer one interface detects a failure of the primary physical path, then the layer one interface automatically re-routes the traffic over the back-up physical path. An example of layer one protection is SONET 4-fiber, bi-directional, line-switched ring protection. SONET systems re-route traffic from a failed work path to a protect path. SONET systems also use rings, where if both work and protect physical paths fail around one side of the ring, then traffic is re-routed to the protect path around the opposite side of the ring. Another example of layer one protection is digital cross-connect systems that make connections/disconnections to physically replace a failed trunk with a back-up trunk between switches.

OSI layer two is the data link layer, and layer two protection entails re-sending traffic that is not properly received by the switch on the receiving end of the trunk. Thus, layer two protection ensures that packets are correctly transferred from one switch to another over their connecting trunk. Examples of layer two protection include the Proprietary Network-to-Network Interface (PNNI) for ATM and Dynamic Packet Routing Service (DPRS) for FR. In cases where a trunk fails or becomes congested, layer two protection will divert the traffic to another trunk.

OSI layer three is the network layer, and layer three protection entails re-sending traffic that is not properly received by the destination. Thus, layer three protection ensures that packets are correctly transferred from source to destination over the connecting network. Examples of layer three protection include the Transmission Control Protocol (TCP) that is used with IP.

Current communication networks typically implement protection schemes at layer one, layer two, and layer three. Unfortunately, layer one protection requires significant excess bandwidth to provide the back-up physical paths—especially when SONET rings are used. The increased bandwidth leads to increased cost. The multiple protection schemes are also complex to manage as communication networks migrate closer to a mesh configuration.

SUMMARY OF THE INVENTION

Some examples of the invention include a communication network architecture comprising an access tier including access packet switches coupled to users, a backbone tier including hub packet switches coupled to one another, and a transit tier including transit packet switches coupling the access tier to the backbone tier. The access packet switches are coupled to the transit tier by physically diverse access communication trunks. The transit packet switches are coupled to the backbone tier by physically diverse transit communication trunks. OSI layer one protection is disabled between the access tier and the transit tier and is disabled between the transit tier and the backbone tier. OSI layer two protection is enabled between the access tier and the transit tier and is enabled between the transit tier and the backbone tier.

Some examples of the invention include a communication network architecture comprising a plurality of access packet switches, a plurality of transit packet switches, a plurality of hub packet switches, a plurality of backbone communication trunks coupling the hub packet switches together, a plurality of transit communication trunks coupling the hub packet switches to the transit packet switches, and a plurality of access communication trunks coupling the transit packet switches to the access packet switches. Each one of the transit packet switches is coupled to two of the hub packet switches by physically diverse ones of the transit communication trunks. Each one of the access packet switches is coupled to two of the transit packet switches by physically diverse ones of the access communication trunks. The access packet switches and the transit packet switches are configured to exchange user communication packets over the access communication trunks. The transit packet switches and the hub packet switches are configured to exchange the user communication packets over the transit communication trunks. The hub packet switches are configured to exchange the user communication packets with one another over the backbone communication trunks. The access packet switches, the transit packet switches, and the hub packet switches are configured to implement layer two protection for the user communication packets. Layer one protection is disabled on the access communication trunks and the transit communication trunks.

Some examples of the invention include a communication network architecture comprising a plurality of communication trunks, a plurality of communication nodes, and a control system. The communication nodes are configured to exchange user communications over the communication trunks. The communication nodes are configured to enable or disable layer one protection and enable or disable layer two protection for a selected one of the communication trunks in response to a control message. The control system is configured to select the selected one of the communication trunks and a protection scheme for the selected one of the communication trunks. The selected protection scheme indicates if layer one protection is enabled or disabled and whether layer two protection is enabled or disabled. In response, the control system is configured to generate and transfer the control message indicating the selected one of the communication trunks and the selected protection scheme for the selected one of the communication trunks.

Some examples of the invention include a communication network architecture comprising a plurality of communication trunks, a plurality of communication nodes, and a control system. The communication nodes are configured to exchange user communications over the communication trunks. The communication nodes are configured to enable or disable layer one protection and enable or disable layer three protection for a selected one of the communication trunks in response to a control message. The control system is configured to select the selected one of the communication trunks and a protection scheme for the selected one of the communication trunks. The selected protection scheme indicates if layer one protection is enabled or disabled and whether layer three protection is enabled or disabled. In response, the control system is configured to generate and transfer the control message indicating the selected one of the communication trunks and the selected protection scheme for the selected one of the communication trunks.

BRIEF DESCRIPTION OF THE DRAWINGS

The same reference number represents the same element on all drawings.

DETAILED DESCRIPTION OF THE PREFERRED EMBODIMENT

Figure 1:
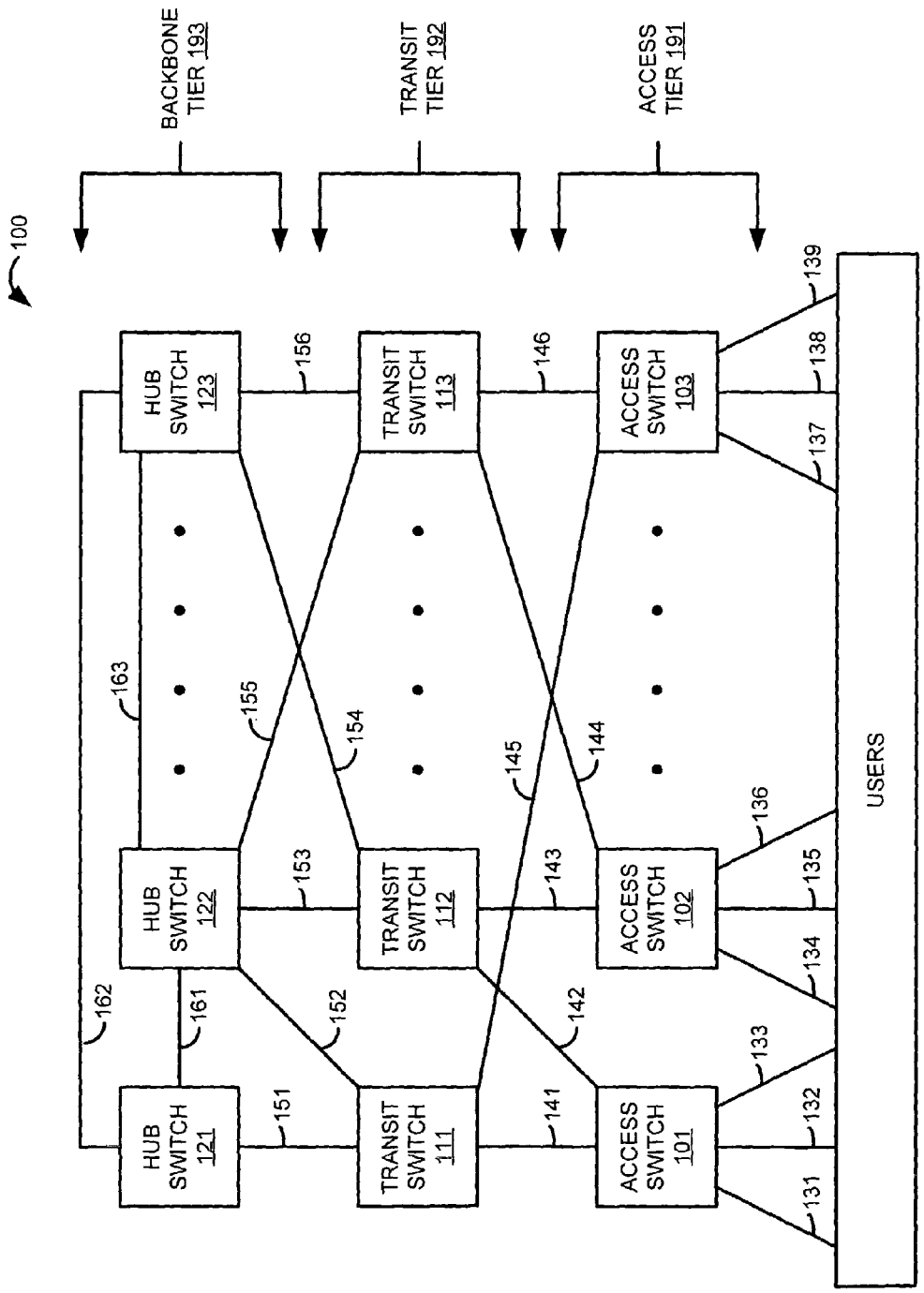
FIG. 1 illustrates a communication network architecture in an example of the invention.
Figure 2:
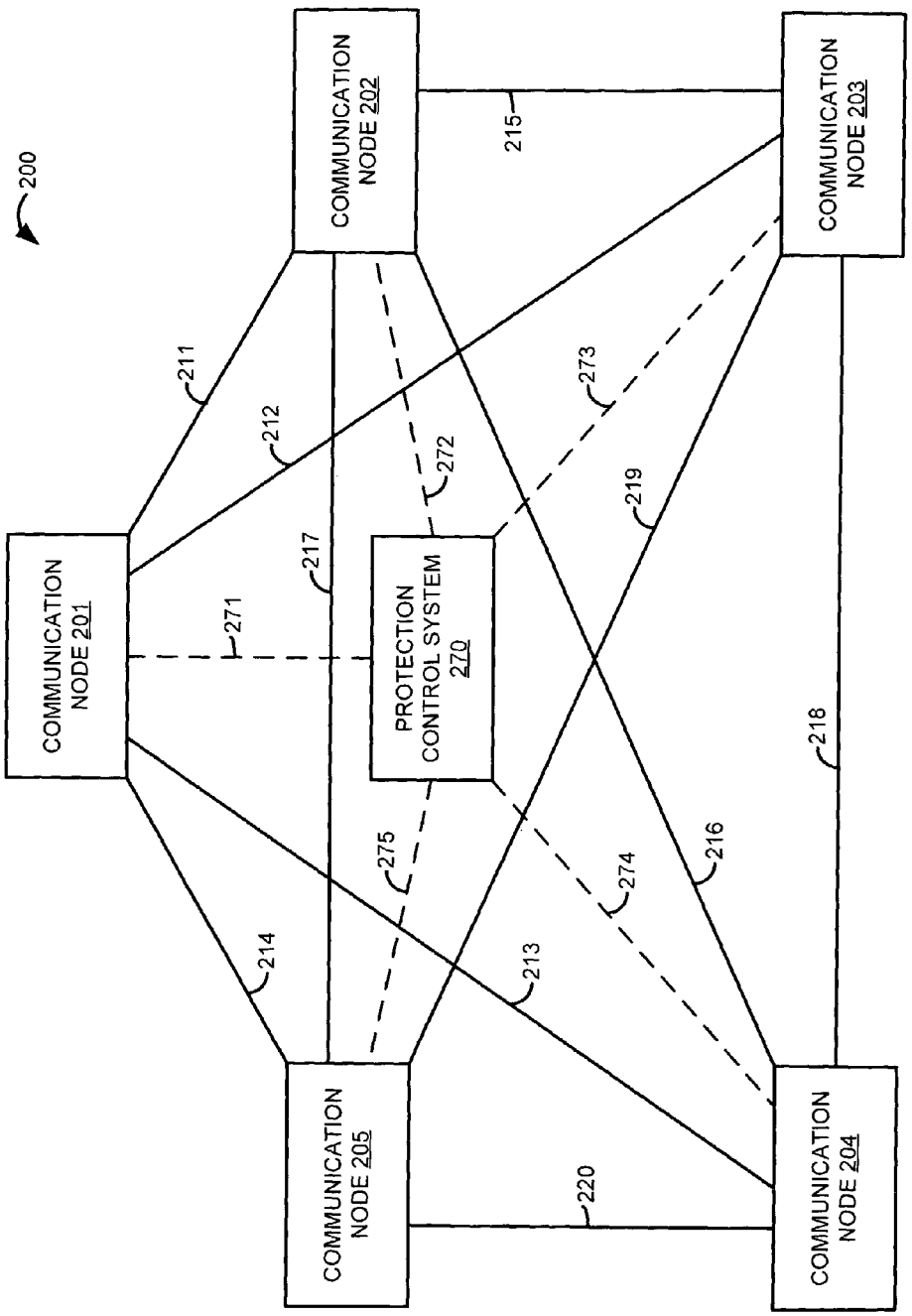
FIG. 2 illustrates a communication network architecture in an example of the invention.
Figure 3:
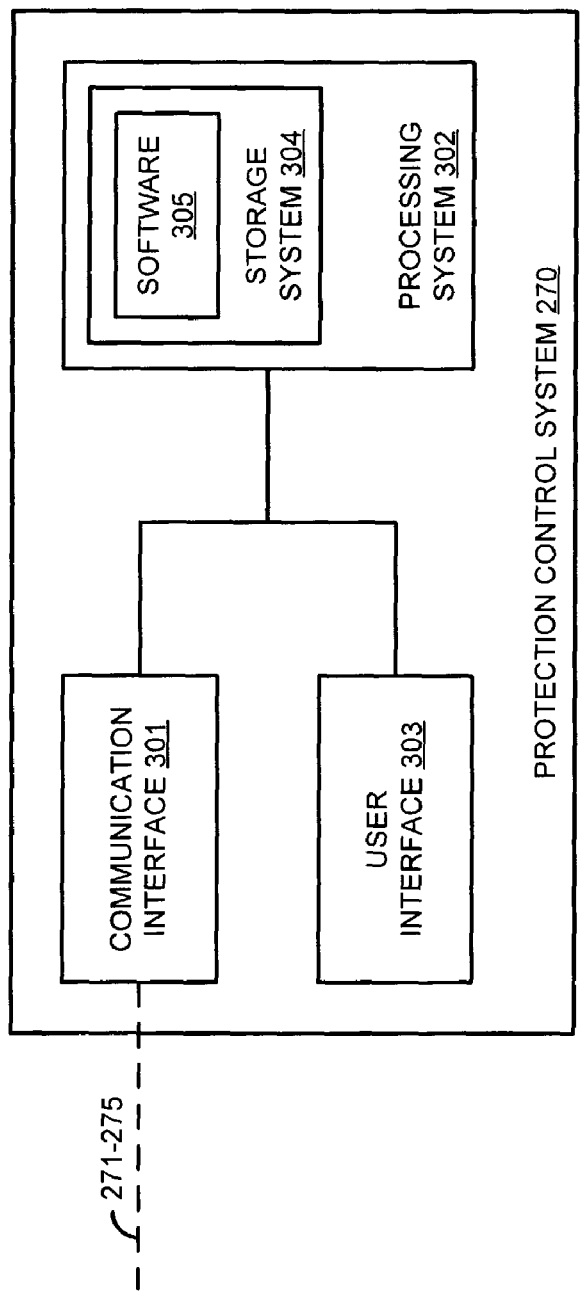
FIG. 3 illustrates a protection control system in an example of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Example #1

FIG. 1 illustrates communication network architecture 100 in an example of the invention. Communication network architecture 100 includes access packet switches 101-103, transit packet switches 111-113, hub packet switches 121-123, access communication trunks 141-146, transit communication trunks 151-156, and backbone communication trunks 161-163. The number of switches and trunks has been restricted for clarity, but there could be more switches and trunks if needed. Typically there are more access packet switches than transit packet switches, and there are more transit packet switches than hub packet switches.

Packet switches 101-103, 111-113, and 121-123 could be Frame Relay (FR) switches, Asynchronous Transfer Mode (ATM) switches, Internet Protocol (IP) switches, or some other type of packet switches. In addition, the switches may integrate packet switching for multiple formats. For example, a packet switch may handle both FR traffic and ATM traffic—possibly by encapsulating the FR traffic in ATM cells. The packet switches also have internal or external physical layer interfaces, such as Synchronous Optical Network (SONET) interfaces or DS1/DS3 electrical interfaces.

User communication trunks 131-139 couple the users to access packet switches 101-103. Access communication trunks 141-146 couple access packet switches 101-103 to transit packet switches 111-113. Transit communication trunks 151-156 couple transit packet switches 151-156 to hub packet switches 121-123. Backbone communication trunks 161-163 couple hub packet switches 121-123 together.

Each of trunks 141-146, 151-156, and 161-163 comprises a communication link between two switches. The communication link is typically bi-directional and resides in an optical fiber, although metallic, wireless, or some other form of media may be used for the communication link. Multiple communication links may occupy the same physical media.

Note that a trunk may be physically diverse with another trunk. Physical diversity means that the two trunks follow substantially different physical paths. Substantially different physical paths may overlap when they are proximate to the switch that both trunks are coupled to, but otherwise, the different physical paths do no overlap.

The following table indicates the specific switch/trunk/user interconnections.

| TRUNK | COUPLED TO | COUPLED TO | DIVERSE WITH |
|---|---|---|---|
| 131 | USERS | ACCESS SWITCH 101 | — |
| 132 | USERS | ACCESS SWITCH 101 | — |
| 133 | USERS | ACCESS SWITCH 101 | — |
| 134 | USERS | ACCESS SWITCH 102 | — |
| 135 | USERS | ACCESS SWITCH 102 | — |
| 136 | USERS | ACCESS SWITCH 102 | — |
| 137 | USERS | ACCESS SWITCH 103 | — |
| 138 | USERS | ACCESS SWITCH 103 | — |
| 139 | USERS | ACCESS SWITCH 103 | — |
| 141 | ACCESS SWITCH 101 | TRANSIT SWITCH 111 | TRUNK 142 |
| 142 | ACCESS SWITCH 101 | TRANSIT SWITCH 112 | TRUNK 141 |
| 143 | ACCESS SWITCH 102 | TRANSIT SWITCH 112 | TRUNK 144 |
| 144 | ACCESS SWITCH 102 | TRANSIT SWITCH 113 | TRUNK 143 |
| 145 | ACCESS SWITCH 103 | TRANSIT SWITCH 111 | TRUNK 146 |
| 146 | ACCESS SWITCH 103 | TRANSIT SWITCH 113 | TRUNK 145 |
| 151 | TRANSIT SWITCH 111 | HUB SWITCH 121 | TRUNK 152 |
| 152 | TRANSIT SWITCH 111 | HUB SWITCH 122 | TRUNK 151 |
| 153 | TRANSIT SWITCH 112 | HUB SWITCH 122 | TRUNK 154 |
| 154 | TRANSIT SWITCH 112 | HUB SWITCH 123 | TRUNK 153 |
| 155 | TRANSIT SWITCH 113 | HUB SWITCH 122 | TRUNK 156 |
| 156 | TRANSIT SWITCH 113 | HUB SWITCH 123 | TRUNK 155 |
| 161 | HUB SWITCH 121 | HUB SWITCH 122 | — |
| 162 | HUB SWITCH 121 | HUB SWITCH 123 | — |
| 163 | HUB SWITCH 122 | HUB SWITCH 123 | — |

Note that each one of access packet switches 101-103 is coupled to two of transit packet switches 111-113 by physically diverse access communication trunks 141-146. For example, access packet switch 101 is coupled to transit packet switch 111 by trunk 141 and to transit packet switch 112 by trunk 142—where trunk 141 is physically diverse from trunk 142. Also note that each one of transit packet switches 111-113 is coupled to two of hub packet switches 121-123 by physically diverse ones of access communication trunks 151-156. For example, transit packet switch 111 is coupled to hub packet switch 121 by trunk 151 and to hub packet switch 122 by trunk 152—where trunk 151 is physically diverse from trunk 152.

In operation, the users and access packet switches 101-103 exchange user communication packets over user trunks 131-139. Access packet switches 101-103 and transit packet switches 111-113 exchange user communication packets over access communication trunks 141-146. Transit packet switches 111-113 and hub packet switches 121-123 exchange the user communication packets over transit communication trunks 151-156. Hub packet switches 121-123 exchange the user communication packets with one another over backbone communication trunks 161-163. Thus, the users may exchange user communication packets with one another over communication network architecture 100.

Each of access packet switches 101-103 distributes its traffic to coupled ones of access communication trunks 141-146. For example, for traffic sent to the transit switches, access packet switch 101 sends some of its traffic over trunk 141 and sends the rest of its traffic over trunk 142. Likewise, transit packet switches 111-113 distribute their traffic over transit communication trunks 151-156. For example, for traffic sent to the hub switches, transit packet switch 111 sends some of its traffic over trunk 151 and sends the rest of its traffic over trunk 152. Thus, the packet switches distribute traffic over diverse trunks to create the diverse-distributed aspects of the network architecture.

The load on each of trunks 141-146 and 151-156 is limited to a percentage of trunk capacity to maintain some excess capacity on each trunk. The excess capacity is used to handle increased traffic loading if another trunk fails. For example, trunks 141-146 and 151-156 could be limited to 50% of their capacity during normal operation.

Communication network architecture 100 is comprised of three tiers—access tier 191, transit tier 192, and backbone tier 193. Access tier 191 includes access packet switches 101-103 that are coupled to the users. Thus, access tier 191 provides network access to users. Backbone tier 193 includes hub packet switches 121-123 that are interconnected with one another. Thus, backbone tier 193 represents the top of the switching hierarchy where each hub packet switch can route traffic to any of the other hub packet switches. Transit tier 192 includes transit packet switches 111-113 and provides an interface between access tier 191 and backbone tier 193. Note that each packet switch in access tier 191 has two physically diverse trunks to transit tier 192, and each packet switch in transit tier 192 has two physically diverse trunks to backbone tier 193. In some variations, access tier 191 may not use physically diverse trunks to access transit tier 192.

A protection scheme specifies how the switches ensure that user communication packets reach their correct destination. This protection can be implemented at different layers of the well-known Open Systems Interconnection (OSI) Reference Model.

OSI layer one is the physical layer, and layer one protection entails using a back-up physical path when the primary physical path fails. For example, if the layer one interface detects a failure of the primary physical path, then the layer one interface automatically re-routes the traffic over the back-up physical path. An example of layer one protection is SONET protection. SONET systems re-route traffic from a failed work path to a protect path. SONET systems also use rings, where if both work and protect physical paths fail around one side of the ring, then traffic is re-routed to the protect path around the opposite side of the ring. Another example of layer one protection is digital cross-connect systems that make connections/disconnections to physically replace a failed trunk with a back-up trunk between switches.

OSI layer two is the data link layer, and layer two protection entails re-sending traffic that is not properly received by the switch on the receiving end of the trunk. Layer two protection can also be accomplished through the use, by layer two logic, of alternative paths in the event of failure or congestion on the primary path. Thus, layer two protection ensures that packets are correctly transferred from one switch to another over their connecting trunk. Examples of layer two protection include the Proprietary Network-to-Network Interface (PNNI) for ATM and Dynamic Packet Routing Service (DPRS) for FR. In cases where a trunk fails or becomes congested, layer two protection will divert the traffic to another trunk. For example, if trunk 151 fails or becomes congested, then transit packet switch can divert the traffic over trunk 152.

OSI layer one protection is disabled for access communication trunks 141-146 between access packet switches 101-103 and transit packet switches 111-103. OSI layer two protection is enabled for access communication trunks 141-146 between access packet switches 101-103 and transit packet switches 111-103. OSI layer one protection is disabled for transit communication trunks 151-156 between transit packet switches 111-113 and hub packet switches 121-123. OSI layer two protection is enabled for transit communication trunks 151-156 between transit packet switches 111-113 and hub packet switches 121-123. Thus, layer one protection is disabled between access tier 191 and transit tier 192, and disabled between transit tier 192 and backbone tier 193; and layer two protection is enabled between access tier 191 and transit tier 192, and enabled between transit tier 192 and backbone tier 193.

Example #2

FIG. 2 illustrates communication network architecture 200 in an example of the invention. Communication network architecture 200 includes communication nodes 201-205, communication trunks 211-220, protection control system 270, and control links 271-275. Control links 271-275 connect protection control system 270 to respective communication nodes 201-205. The following table indicates how communication nodes 201-205 are connected by communication trunks 211-220.

| TRUNK | NODE | NODE |
|---|---|---|
| 211 | 201 | 202 |
| 212 | 201 | 203 |
| 213 | 201 | 204 |
| 214 | 201 | 205 |
| 215 | 202 | 203 |
| 216 | 202 | 204 |
| 217 | 202 | 205 |
| 218 | 203 | 204 |
| 219 | 203 | 205 |
| 220 | 204 | 205 |

Communication nodes 201-205 include a layer one interface, such as SONET. Communication nodes also include a layer two interface, such as ATM or FR, and/or a layer three interface, such as and TCP/IP. Communication nodes 201-205 exchange user communications over communication trunks 211-220

Communication nodes 201-205 can enable or disable protection at layers one, two, and three for selected communication trunks in response to control messages. For example, communication nodes 201 and 202 can disable layer one protection and enable layer two protection on communication trunk 211 in response to control messages. Likewise, communication nodes 204 and 205 can enable layer one protection and disable layer two protection on communication trunk 220 in response to control messages.

Protection control system 270 selects communication trunks and protection schemes for the selected communication trunks. In response, protection control system 270 generates and transfers control messages indicating the selected communication trunks and their selected protection schemes. The selected protection scheme indicates which protection layers are enabled and which protection layers are disabled.

For example, protection control system 270 may select communication link 215 between communication nodes 202-203. Protection control system 270 may then select a protection scheme with layer 1 protection disabled and layer 2 protection enabled. In response, protection control system 270 generates and transfers control messages to communication nodes 202-203 over respective control links 272-273 indicating the selected communication trunk 215 and the selected protection scheme. In response to the control messages, communication nodes 202-203 disable layer one protection and enable layer two protection on communication trunk 215.

In another example, protection control system 270 may select communication link 218 between communication nodes 203-204. Protection control system 270 may then select a protection scheme with layer 1 protection enabled and layer 2 protection disabled. In response, protection control system 270 generates and transfers control messages to communication nodes 203-204 over respective control links 273-274 indicating the selected communication trunk 218 and the selected protection scheme. In response to the control messages, communication nodes 203-204 enable layer one protection and disable layer two protection on communication trunk 218

In some variations, protection control system 270 has a user interface that allows an operator to select trunks and protection schemes, and protection control system 270 makes its selections based on operator inputs. For example, protection control system 270 could provide a graphic display of the network to allow operator trunk selection on the display. Once the trunk is selected, the display may show a dialog box indicating the current protection scheme to allow the operator to change the protection scheme on the display. A control button on the display would allow the operator to implement new protection schemes for selected trunks by issuing the appropriate control messages to the appropriate communication nodes.

In some variations, protection control system 270 may automatically select trunks and protection schemes in response to user communication history data and service level agreement data. For example, a user may have a service level agreement that requires a certain level of quality from the communication network. If the user communication history data indicates that recent outages are threatening to drop actual network performance below the level of quality required by the service level agreement, then protection control system can improve the protection scheme on trunks that carry user communications. In response to these changes, protection control system 270 issues the appropriate control messages to communication nodes 201-205.

FIG. 3 illustrates protection control system 270 in an example of the invention. Protection control system 270 includes communication interface 301, processing system 302, and user interface 303. Processing system 302 includes storage system 304. Storage system 304 stores software 305. Processing system 302 is linked to communication interface 301 and user interface 303. Protection control system 270 could be comprised of a programmed general-purpose computer, although those skilled in the art will appreciate that programmable or special purpose circuitry and equipment may be used. Protection control system 270 may use a client server architecture where operations are distributed among a server system and client devices that together comprise elements 301-305.

Communication interface 301 could comprise a network interface card, modem, port, or some other communication device. Communication interface 301 may be distributed among multiple communication devices. Processing system 302 could comprise a computer microprocessor, logic circuit, or some other processing device. Processing system 302 may be distributed among multiple processing devices. User interface 303 could comprise a keyboard, mouse, voice recognition interface, microphone and speakers, graphical display, touch screen, or some other type of user device. Storage system 304 could comprise a disk, tape, integrated circuit, server, or some other memory device. Storage system 304 may be distributed among multiple memory devices.

Processing system 302 retrieves and executes software 305 from storage system 304. Software 305 may comprise an operating system, utilities, drivers, networking software, and other software typically loaded onto a general-purpose computer. Software 305 could comprise an application program, firmware, or some other form of machine-readable processing instructions. When executed by processing system 302, software 305 directs processing system 302 to control protection control system 270 operation as described herein.

Those skilled in the art will appreciate that aspects of Example #1 and Example #2 could be implemented together to form variations of the invention.

ADVANTAGES

If desired, the invention may be implemented to provide some of the following advantages, although other implementations of the invention may provide different advantages.

In some examples, the invention disables layer one protection to save bandwidth and its resulting cost. These examples use layer two or three protection and diverse-distributed trunking to provide cost-effective protection for the user communications. The diverse-distributed trunking architecture is also less complex to manage than current architectures having layer one protection.

In some examples, the invention allows the selection of a protection scheme on a per trunk basis. This provides an effective way to manage protection across the network. These examples allow the network to set protection levels that meet the cost and quality requirements of the user.

The invention claimed is:
1. A communication network architecture comprising:
a plurality of access packet switches;
a plurality of transit packet switches;
a plurality of hub packet switches;
a plurality of backbone communication trunks coupling the hub packet switches together;

a plurality of transit communication trunks coupling the hub packet switches to the transit packet switches wherein each one of the transit packet switches is coupled to two of the hub packet switches by physically diverse ones of the transit communication trunks, wherein at least one of the transit packet switches is configured to receive traffic and to send a portion of the traffic to each of the two of the hub packet switches during normal operation and during non-normal operation to divert a portion of traffic from at least one congested or failing transit communication trunk of the plurality of transit communication trunks to at least another transit communication trunk of the plurality of transit communication trunks;

a plurality of access communication trunks coupling the transit packet switches to the access packet switches wherein each one of the access packet switches is coupled to two of the transit packet switches by physically diverse ones of the access communication trunks, wherein at least one of the access packet switches is configured to receive traffic and to send a portion of the traffic to each of the two of the transit packet switches during normal operation and during non-normal operation to divert a portion of traffic from at least one congested or failing access communication trunk of the plurality of access communication trunks to at least another access communication trunk of the plurality of access communication trunks;

wherein the access packet switches and the transit packet switches are configured to exchange user communication packets over the access communication trunks, wherein the transit packet switches and the hub packet switches are configured to exchange the user communication packets over the transit communication trunks, and wherein the hub packet switches are configured to exchange the user communication packets with one another over the backbone communication trunks; and wherein the access packet switches, the transit packet switches, and the hub packet switches are configured to receive a control message indicating an individual trunk of the access communication trunks, the transit communications trunks, nd backbone communication trunks, and responsively change a protection scheme for the user communication packets through the individual trunk from a first scheme at a first layer to a second scheme at a second layer based on a required network quality level.

2. The communication network architecture of claim 1 wherein the access communication trunks and the transit communication trunks are each limited to 50% of their capacity during normal operation.

3. A communication network architecture comprising:

an access tier including access packet switches coupled to users;

a backbone tier including hub packet switches coupled to one another, a transit tier including transit packet switches coupling the access tier to the backbone tier;

wherein the access packet switches are coupled to the transit tier by physically diverse access communication trunks;

wherein at least one of the access packet switches is configured to receive traffic and to send a portion of the traffic to each of two of the transit packet switches during normal operation and during non-normal operation to divert a portion of traffic from at least one congested or failing transit communication trunk of the plurality of transit communication trunks to at least another transit communication trunk of the plurality of transit communication trunks;

wherein the transit packet switches are coupled to the backbone tier by physically diverse transit communication trunks;

wherein at least one of the transit packet switches is configured to receive traffic and to send a portion of the traffic to each of two of the hub packet switches during normal operation and during non-normal operation to divert a portion of traffic from at least one congested or failing access communication trunk of the plurality of access communication trunks to at least another access communication trunk of the plurality of access communication trunks;

wherein the at least one of the access packet switches and the at least one of the transit packet switches are configured to receive a control message indicating an individual trunk of the access communication trunks and the transit communications trunks, and responsively change a first OSI layer protection scheme for the trunk to a second OSI layer protection scheme based on a required network quality level.

* * * * *